US006815572B1

(12) United States Patent
Brunelot et al.

(10) Patent No.: US 6,815,572 B1
(45) Date of Patent: Nov. 9, 2004

(54) METHOD AND DEVICE FOR INCINERATION AND VITRIFICATION OF WASTE, IN PARTICULAR RADIOACTIVE WASTE

(75) Inventors: Pierre Brunelot, Merignac (FR); Jacques Lacombe, Piliaut (FR); Serge Merlin, Igny (FR); Patrice Roux, Paris (FR); Valérie Thiebaut, Roquemaure (FR); Kwan-Sik Choi, Taejon (KR); Myung-Jae Song, Taejon (KR)

(73) Assignees: Korea Electric Power Corporation, Seoul (KR); Societe General pour les Techniques Nouvelles - SGN, St. Quentin en Yvelines (FR)

( * ) Notice: Subject to any disclaimer, the term of this patent is extended or adjusted under 35 U.S.C. 154(b) by 0 days.

(21) Appl. No.: 09/856,684

(22) PCT Filed: Dec. 1, 1999

(86) PCT No.: PCT/FR99/02977

§ 371 (c)(1),
(2), (4) Date: May 24, 2001

(87) PCT Pub. No.: WO00/32524

PCT Pub. Date: Jun. 8, 2000

(30) Foreign Application Priority Data

Dec. 1, 1998 (KR) .......................................... 98/052360
Dec. 1, 1998 (KR) .......................................... 98/052361

(51) Int. Cl.$^7$ ................................................ A62D 3/00
(52) U.S. Cl. ...................... 588/201; 588/205; 588/900; 110/236; 110/243; 110/251; 423/DIG. 12
(58) Field of Search ............................. 588/11, 12, 19, 588/201, 900, 205; 65/134.4, 134.5, 134.8, 355; 110/236, 237, 243, 251, 255, 238; 423/DIG. 12

(56) References Cited

U.S. PATENT DOCUMENTS 3,607,171 A    9/1971  Hirsch ........................... 65/22
4,449,483 A  * 5/1984  Strohmeyer, Jr. .......... 122/4 D (List continued on next page.)

FOREIGN PATENT DOCUMENTS

DE    44 46 576 C1    4/1996
EP    0 647 598 A1    4/1995
WO       95/04004     2/1995

OTHER PUBLICATIONS

Pujadas, Valèrie, "Reactor Waste Treatment by Direct Vitrification: Main Experiment Results". KAIF '98, Korean Atomic Industrial Forum, Seoul, Korea, Apr. 14–17, 1998.

Primary Examiner—Stuart L. Hendrickson
Assistant Examiner—Peter J Lish
(74) Attorney, Agent, or Firm—Gary M. Nath; Marvin C. Berkowitz; Joshua B. Goldberg

(57) ABSTRACT

The present invention provides a method of processing organic waste (D) in divided solid and/or liquid form, the method being implemented in a single reactor (1) containing a bath of molten glass (V) surmounted by a gas phase (G), the method comprising incinerating said waste (D) in the presence of oxygen at the surface (S) of said bath of molten glass (V), and in vitrifying said incinerated waste (D) in said bath of molten glass (V). In said method, and in characteristic manner, in addition to the oxygen delivered as oxidizer into said gas phase (G), oxygen is also injected into said bath of molten glass (V) in a quantity that is sufficient to minimize or to avoid any formation of metal within said bath of glass (V); advantageously in a quantity that is sufficient to minimize or to avoid any formation of metal within said bath of glass (V) and also to subject said bath of glass (V) to moderate stirring. The present invention also provides apparatus for processing organic waste (D) in divided solid and/or liquid form by incineration and vitrification, the apparatus being suitable for implementing said method.

16 Claims, 4 Drawing Sheets

U.S. PATENT DOCUMENTS

| | | | | |
|---|---|---|---|---|
| 5,188,649 A | * | 2/1993 | Macedo et al. | 65/21.3 |
| 5,251,879 A | * | 10/1993 | Floyd | 266/44 |
| 5,282,431 A | * | 2/1994 | Kiss | 110/346 |
| 5,308,043 A | * | 5/1994 | Floyd et al. | 266/78 |
| 5,548,611 A | * | 8/1996 | Cusick et al. | 373/18 |
| 5,615,626 A | * | 4/1997 | Floyd et al. | 110/346 |
| 5,643,350 A | | 7/1997 | Mason et al. | 65/158 |
| 5,678,244 A | * | 10/1997 | Shaw et al. | 588/201 |
| 5,728,190 A | | 3/1998 | Pieper et al. | 65/134.4 |
| 5,788,723 A | * | 8/1998 | Kiss | 48/197 A |
| 5,960,722 A | * | 10/1999 | Kiss | 110/229 |
| 6,576,807 B1 | * | 6/2003 | Brunelot et al. | 588/201 |

* cited by examiner

METHOD AND DEVICE FOR INCINERATION AND VITRIFICATION OF WASTE, IN PARTICULAR RADIOACTIVE WASTE

The present invention relates to a method and to apparatus for incinerating and vitrifying waste, in particular radioactive waste.

Said invention lies within the context of processing dangerous combustible waste for which it is appropriate to fix the ash in stable manner. To neutralize waste of that type, it has long been the practice to operate in two stages, each of said stages being implemented in an independent apparatus:

- a first step of incinerating said organic waste, in divided solid and/or liquid form, in an incinerator apparatus; and
- a second stage of fixing the ash recovered from said first stage, said second stage being implemented in suitable apparatus that contains a bath of glass maintained in the molten state.

Nevertheless, for several years, waste processing methods have been described in which said two stages of incinerating said waste and fixing the resulting ash have been implemented in a single apparatus. In this context, a term that is used is "direct vitrification".

Results obtained in said context by the Applicants have been described in particular at the "Korean Atomic Industrial Forum" (KAIF) '98, which was held Apr. 14 to 17, 1998 in Seoul, South Korea. Said results demonstrated the feasibility of a direct vitrification method, in which the waste is burned for the most part at the surface of a bath of molten glass, in an oxidizing atmosphere, with the ash that is generated being trapped and fixed in said bath of molten glass; since said method was implemented in a cold crucible, said bath of molten glass was heated by induction.

Continuing their work on direct vitrification, the Applicants have designed and developed the present invention which can be considered as being an improvement of said direct vitrification as presently known. The improvement which constitutes the main subject matter of the present invention can be thought of both in terms of a method and in terms of apparatus, and it involves the quality of the bath of glass. Said improvement which, in order to clarify the present description, can be referred to as the "main" improvement, is advantageously implemented with other improvements that, in the same spirit, can be referred to as "secondary" improvements. Said main and secondary improvements are described below in general terms and then in greater detail with reference to the accompanying figures.

Thus, in a first aspect, the present invention provides a method of processing organic waste (i.e. combustible waste) in divided solid form (to facilitate insertion and combustion) and/or in liquid form, the method being implemented in a single reactor containing a bath of molten glass surmounted by a gas phase; said processing method comprising: incinerating said waste in the presence of oxygen at the surface of said bath of molten glass (said waste falling onto said surface, decomposing thereon, and the resulting gaseous products of said decomposition being burned in said oxygen-containing gas phase); and vitrifying said incinerated waste in said bath of molten glass. In this respect, the method of the invention is a direct vitrification method.

In characteristic manner, said method further comprises injecting oxygen into said bath of molten glass, in sufficient quantity to minimize or to avoid any formation of metal within said bath of glass; advantageously, in sufficient quantity to minimize or to avoid any formation of metal within said bath of glass and to subject bath of glass to moderate stirring.

Said oxygen which is introduced in original manner into the bath of molten glass is introduced into the process reactor in addition to the oxygen being delivered in conventional manner as oxidizer into the gas overlying said bath, in order to ensure that the waste is incinerated.

In characteristic manner, in the context of the method of the invention, not only does said oxidizer in the gas phase react, but so also does the oxygen within the bath of glass, said oxygen serving to adjust the oxidation-reduction (redox) potential of said bath of glass (thus serving to limit the reducing nature of the glass).

By controlling the redox potential of the bath of glass in this way, it is possible within said bath of glass to prevent oxides being reduced and thus to prevent metals being formed. The presence of such metals within said bath is very harmful to the uniformity of said bath, and thus to the quality of the vitrification obtained. In addition, the presence of metal can give rise to real difficulties when performing heating by induction . . . .

The oxygen injected into the bath of glass to minimize or even to avoid the formation of metal is advantageously injected in sufficient quantity also to ensure that said bath of glass is stirred somewhat. The person skilled in the art knows how to optimize the quantity of oxygen required for these purposes. In any event, the quantity must be sufficient to obtain the desired effect concerning the value of the redox potential, and indeed the desired effects concerning the value of said potential and also the looked-for stirring effect, but it must not be excessive, insofar as the bath of glass while being stirred and mixed must nevertheless remain a bath of glass and must not be transformed into a foam . . . .

Oxygen has been mentioned as the oxidizer involved in the gas and as the oxidant gas introduced into the bath of glass, and this is appropriate insofar as said oxygen is generally delivered as a "pure" gas. Nevertheless, it is not entirely beyond the scope of the present invention to use a gas that contains oxygen, and in particular to use air, optionally enriched in oxygen, as the oxidizer and as the oxidant gas.

The oxygen delivered as oxidizer into the gas phase is advantageously optimized for the incineration in question, so as to be present in a quantity that is greater than the theoretically required stoichiometric quantity. Advantageously, this oxygen is present in a quantity that lies in the range 1.25 to 1.5 times said stoichiometric quantity. Nevertheless, said quantity is controlled and does not interfere with the negative pressure that is maintained within the reactor in conventional manner for obvious safety reasons. Said negative pressure is maintained by sucking out the combustion gases, where said suction is implemented under conditions such as to minimize the amount of waste, and above all the amount of ash, that is entrained.

Once the principle of the main improvement provided by the invention to the direct vitrification method has been accepted (i.e. the principle of injecting oxygen into the bath of glass), the way in which it is implemented can be subject to several variants, in contexts that are somewhat different.

In particular, the method of the invention can be implemented with a bath of glass that is practically pre-constituted (i.e. present in the reactor before the waste is introduced therein), or with a bath of glass that is constituted progressively from some minimum initial fill. In this second variant, which is preferred, the reactor starts by containing an initial bath of glass that is of small volume (a starter) and it is subsequently fed both with waste and with substances for forming a bath of glass. Said waste and said glass-forming substances are also advantageously introduced as a mixture . . . with the waste being treated as one of the precursors of substances for making said bath of glass. The reactor is thus fed continuously with waste and with substances for forming the bath of glass, and indeed with additives therefor. Once a certain level has been reached, both types of feed are stopped and the resulting bath of glass can be emptied out.

In a preferred variant implementation of the method of the invention, the oxygen which is injected into the bath of glass is introduced into the reactor beneath the surface of said bath of glass. Thus, the means for injecting said oxygen do not pass through the gas phase in said reactor, and are therefore subject to one type of corrosion only: the corrosion inherent to said bath of glass.

This type of comment applies to any device that is to penetrate into said bath of glass in order to deliver any substance (injecting oxygen has just been mentioned) or to measure any parameter therein (such as temperature, redox potential, . . . ). Thus, any device for penetrating into said bath of glass is advantageously introduced into the reactor from beneath the surface of said bath of glass so as to avoid coming into any contact with the gas phase.

There follows a general description in method terms of the secondary improvements of the present invention.

The method of the invention which comprises injecting oxygen into the bath of glass is advantageously implemented together with cooling of the walls of the reactor and/or, preferably, of the means introduced into said reactor, both in said gas phase and in the bath of glass, which means are introduced in particular for feeding said reactor with the waste to be incinerated and vitrified, for feeding the reactor with oxygen both in its gas phase (said oxygen being used as an oxidizer) and in said bath of glass (said oxygen then acting as an oxidant for adjusting the redox potential of said bath of glass and advantageously for stirring purposes).

This list of means that are advantageously cooled is not limiting. For example, it could include means for measuring the temperature of the gas phase, means for measuring the temperature of the bath of glass, means for measuring the redox potential of said bath of glass, means for measuring the level of said bath of glass, . . . .

Such cooling is intended above all to provide said walls and said means with protection from corrosion. It is also appropriate to preserve the sealing devices installed in the passages through said walls.

In the structure of the device for feeding the reactor with waste, it is advantageous to implement dual cooling:

first cooling of the device on its gas phase side (outside face); and second cooling of the same device, generally independent of the first, on its waste intake side (inside face).

Said first cooling is intended above all to protect said device from the corrosion that occurs due to coming into contact with the gas phase; said second cooling is intended above all to minimize the amount of heat transferred to the incoming waste, in order to minimize vaporizing liquid waste and to avoid solid waste sticking together, since that can lead to the feeder device becoming clogged.

In order to cool the walls of the reactor and the various means that are introduced into said reactor, it is conventional to make use of cooling fluids, generally cooling liquids. Said walls and said means have circuits for circulating such fluids applied thereto. In a particularly preferred variant of implementation of said cooling, provision is made at least in the walls that come into contact with the gas phase and/or at least in the means introduced into the reactor and coming into contact with said gas phase for at least one cooling fluid to circulate, said fluid being maintained at a temperature that is above the dew point of said gas phase. In this advantageous variant, the idea is to prevent any condensation of said gas phase on said walls and on said outside surfaces of said means. The phenomenon of condensation is clearly harmful, given the problems of corrosion. It can also give rise to electric arcing, and can thus raise serious problems when the bath of glass is heated by induction. In this advantageous variant, it is possible to use a "hot" cooling fluid constituted by superheated water.

The dual cooling referred to above as being advantageously implemented in the device for feeding waste to the reactor is implemented in a particularly preferred variant by using such a "hot" cooling fluid (at a temperature greater than the due point of the gas phase to which it passes), at least for cooling said device where it is adjacent to the gas phase (the first above-mentioned cooling). Said second cooling beside waste intake can make use of such a "hot" cooling fluid only when the waste concerned can withstand the temperature of such a "hot" fluid. As a general rule, said second cooling is implemented with a "cold" cooling fluid, such as water at ambient temperature.

In the method of the invention, in order to heat and maintain the bath of molten glass at a suitable temperature, use can be made of various techniques. Thus, said bath of glass can be heated by induction, by means of a flame, by using a plasma torch, or by means of electrodes dipped into the bath. It is not impossible to use a plurality of said techniques in combination. Induction heating is preferred; induction heating implemented in a cold crucible is most particularly preferred.

The method of the invention as described above and below with reference to the accompanying figures is particularly suitable for processing radioactive waste by direct vitrification.

Said method of the invention is generally implemented with waste being fed in continuously; said waste being introduced above the surface of the bath of glass, possibly mixed with substances suitable for constituting said bath of glass. After a fill has been incinerated and after the ash generated thereby has been digested in the bath of glass, said bath of filled glass is emptied out. Thus, the usual situation is continuous feed (or continuous building up of filler), with emptying out being performed discontinuously.

Nevertheless, in implementing the invention, the following can apply.

The reactor can be fed with waste and oxygen in a manner that is advantageously optimized so as to ensure maximum combustion of said waste while ensuring that the combustion gases entrain a minimum amount of said waste, whether burnt or unburnt. Such optimization relies on combined mastery of numerous parameters, some of which are mentioned above, and in particular mastery of the following:

the size of said waste;

the quantity of oxygen delivered;

the level at which waste is introduced relative to the surface of the bath of glass (advantageously, provision is made to regulate the waste introduction level by regulating the introduction depth of the device for feeding said waste into the reactor); and the quality of the waste/oxygen mixture, when introducing said waste. Said waste is advantageously introduced while immersed in oxygen. For this purpose, at least one oxygen feed circuit is advantageously included in the structure of the device for feeding said waste.

There follows a description in general terms of the second aspect of the present invention, namely apparatus for processing organic waste in the form of divided solids and/or liquids by incineration and by vitrification; which apparatus is suitable for implementing the above-described method. In conventional manner, said apparatus comprises a reactor, associated firstly with heater means suitable for maintaining a bath of molten glass in the bottom of said reactor, and secondly fitted with the following means:

means for emptying said bath of molten glass;

a device for feeding it with waste to be incinerated and vitrified, said device opening out above the surface of said bath of molten glass and its depth of introduction into said reactor advantageously being adjustable;

oxygen feed means delivering said oxygen above the surface of said bath of molten glass (to implement incineration); and at least one combustion gas outlet formed in the top portion of said reactor well above the surface of said bath of molten glass (in order to minimize entraining ash).

Said apparatus, in characteristic manner, is also fitted with means for injecting oxygen into said bath of molten glass.

Said means are advantageously introduced into the bottom portion of the reactor, beneath the surface of the bath of glass so that they do not come into contact with the gas phase, thereby being subjected to one type of corrosion only (that developed by the bath of glass).

Said means are also advantageously arranged in such a manner that on ceasing to feed them with oxygen, they do not constitute a plug of glass at their open end. Thus, said means for injecting oxygen into said bath of glass are advantageously disposed vertically through the bottom (of the bottom plate) of the reactor, and provided with an opening disposed at 90° to the vertical axis.

The essential elements of the apparatus of the invention, necessary for implementing the intended method of incineration and vitrification are those specified above. Other elements can accompany said elements, for example means for measuring the temperature of the gas phase, means for measuring the temperature of the bath of molten glass, means for measuring the level of said bath of molten glass, means for measuring the level of said bath of glass, means for measuring the redox potential of said bath of molten glass, . . . .

In general terms, it has been found advantageous to cool all of the means that are introduced into said reactor (into the gas phase and into the bath of glass). Thus, in an advantageous embodiment of the apparatus of the invention, all of said means introduced into the reactor, and in particular the device for feeding said reactor with waste, the means for feeding the gas phase with oxygen, and the means for injecting oxygen into said bath of glass, include within their structure at least one circuit for circulating a cooling fluid. Said device for feeding said reactor with waste includes, advantageously embedded in the thickness thereof, at least two generally independent circuits of said type, comprising at least one for cooling its thickness together with its outside surface (in order to minimize problems of corrosion), and at least one other for cooling its inside surface (in order to transfer a minimum amount of heat to the incoming waste). Said feeder device generally presents a tubular structure which is defined by an inside surface and an outside surface.

With reference to said feeder device, it can also have the following additions. It advantageously includes in its structure means for conveying and delivering oxygen to its open end (above the bath of glass). Delivery of said oxygen can be provided in particular by means of a torus arranged around the open end of said device, said torus being pierced by suitable orifices, appropriately distributed. Contact between the waste and the oxygen (oxidizer) can thus be optimized.

The inlets and outlets for the cooling fluids advantageously circulated through the structure of the device for feeding the reactor with waste, and also through the oxygen inlet, likewise advantageously circulated through said structure, are connected to appropriate delivery and removal units. The distribution of said fluids and said oxygen in their respective circulation circuits within said feeder device is advantageously organized by means of a set of distribution chambers and channels, suitably arranged.

Advantageously, the reactor is also cooled. Its walls are advantageously of the double-walled type, so as to allow a cooling fluid to circulate therein.

The heater means associated with said reactor can be of various types, and in particular can be suitable for implementing induction heating, flame heating, plasma torch heating, or heating by means of immersed electrodes. In a particularly preferred variant embodiment, the reactor used is a cold crucible and said heater means are induction heater means.

The invention is described below in its method and apparatus aspects with reference to the accompanying figures:

In FIGS. 1 to 4, the same references are used to designate the same elements, whether shown in diagrammatic or detailed manner.

Figure 1:
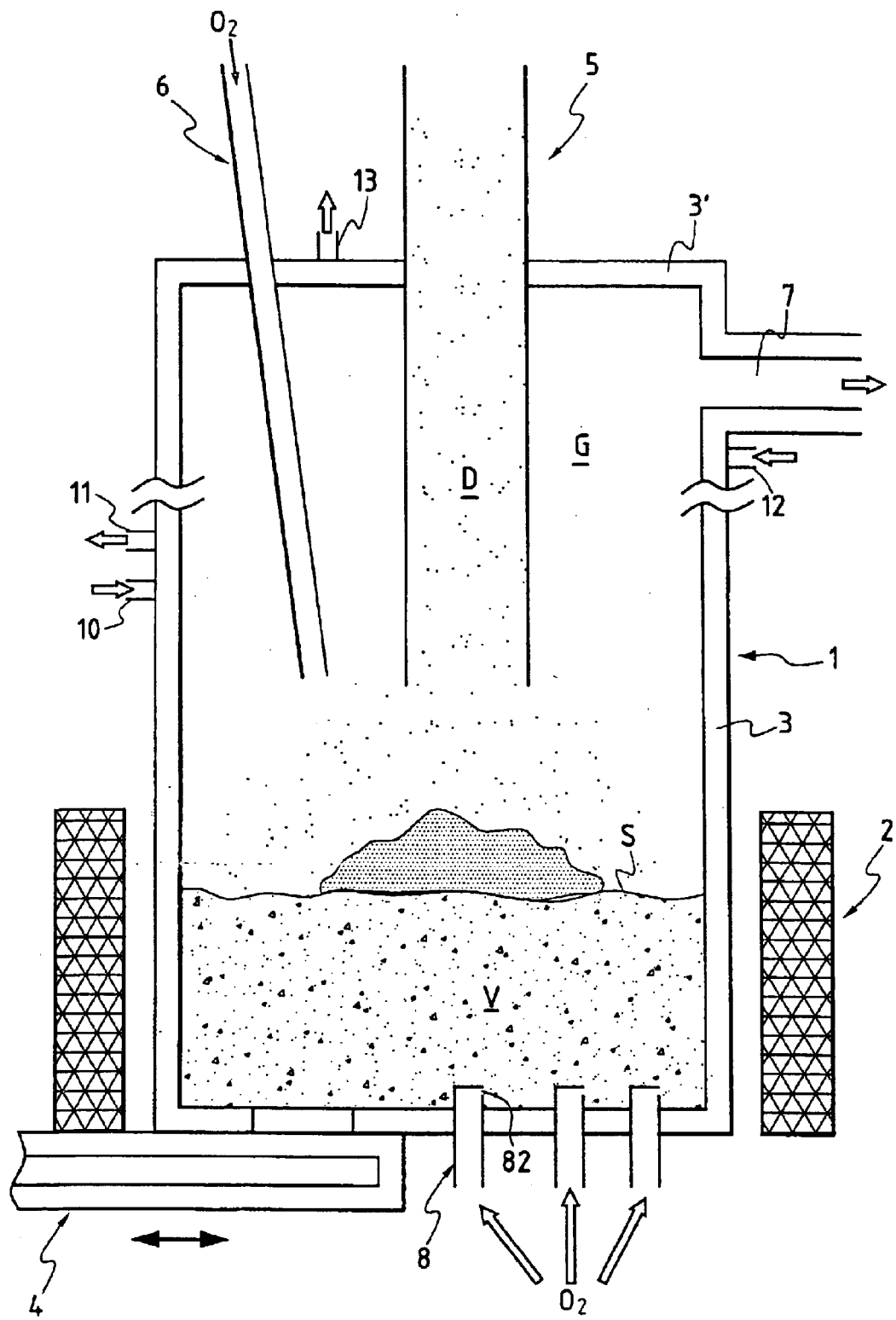
FIG. 1 is a diagrammatic view showing how apparatus of the invention operates.
Figure 2:
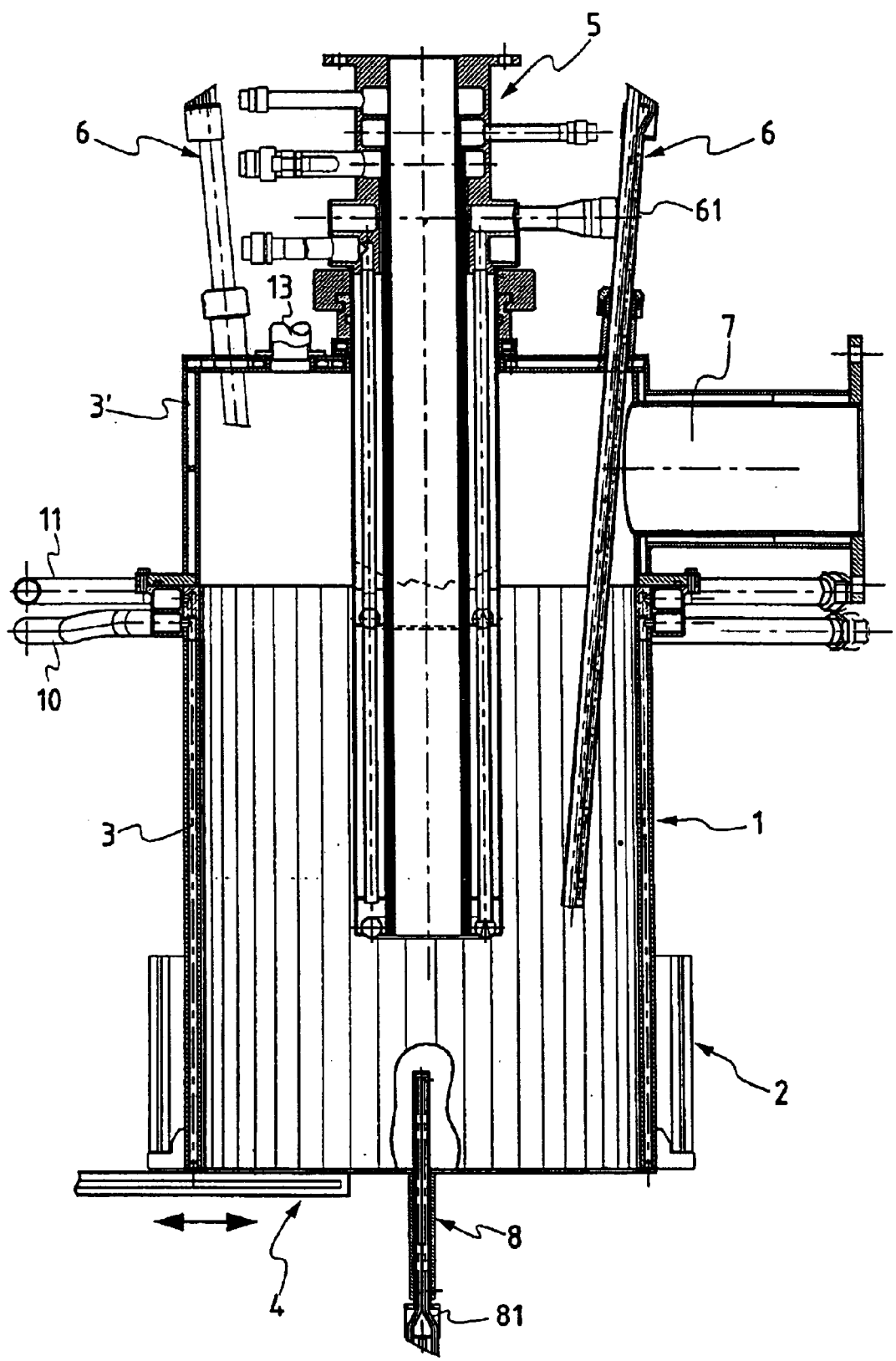
FIG. 2 is a section view in more detail showing apparatus of the same type.

The apparatus of the invention is suitable for processing waste D by incineration and vitrification, i.e. by direct vitrification, and it comprises a reactor 1 associated with heater means 2. Said heater means 2 shown in FIGS. 1 and 2 are suitable for performing induction heating. Within said reactor 1, there can be found a bath of molten glass V surmounted by the gas phase G (FIG. 1).

The method of the invention is summarized with reference to FIG. 1.

The waste D is fed into the reactor 1 via a waste feeder device 5. The waste is decomposed on the surface S of the bath of molten glass V. The gas that results from this decomposition burns on coming into contact with oxygen which is delivered mainly by means 6. FIG. 1 shows a single means 6 for delivering oxygen into the gas phase. Advantageously there are at least two such means disposed symmetrically about said feeder device 5 for feeding said waste D. This is intended to optimize contact between waste D and oxygen in order to optimize combustion of said waste D.

The ash that is generated falls into the bath of glass V. At the surface S of said bath V, there is generally to be found a mass of waste that is in the process of decomposing.

In the upper portion of said reactor 1, there is provided an outlet 7 for the combustion gases. Beneath the bottom of said reactor 1, there are means 4 for emptying out the bath of glass V. Said means 4 are capable, in alternation, of closing and of opening an emptying orifice provided in the bottom of said reactor 1.

In characteristic manner, said bottom of said reactor 1 has means 8 passing therethrough for injecting oxygen into the bath of glass V. Said injector means 8 are disposed vertically and have an opening 82 at 90° relative to their vertical axis. FIG. 1 shows an advantageous variant implementation of the method of the invention.

Finally, FIG. 1 shows that the walls 3 and 3' of said reactor 1 are of the double-walled type. Since the reactor 1 is designed as two portions, its wall in its bottom portion is referenced 3, while its wall in its top portion is referenced 3'. Within each of these two walls 3 and 3', circulation of a cooling fluid is organized. For the wall 3, said fluid arrives via 10 and leaves via 11, while for the wall 3', it arrives via 12 and leaves via 13.

FIG. 2 shows each of the elements referenced in FIG. 1 in greater detail (with the exception of the cooling fluid inlet 12 for circulating cooling fluid in the top wall 3' of the reactor 1).

For a more detailed description of the means 8 for injecting oxygen into the bath of glass, reference should be made to the description below concerning FIG. 3.

For a more detailed description of the device 5 for feeding the reactor with waste D, reference should be made to the description below concerning FIG. 4.

FIG. 2 shows two means 6 designed to feed the gas phase with oxygen (oxidizer). These means are constituted by blowpipes. Within the structure of each of said blowpipes 6, there is provided a circuit 61 for circulating a cooling fluid. The blowpipes which are cooled in this way withstand corrosion better. It is recalled at this point that they are advantageously cooled by circulating a "hot" cooling fluid (i.e. a fluid maintained at a temperature which is higher than the dew point of the gas phase through which they pass), thereby preventing any condensation on the outside surfaces thereof.

Figure 3:
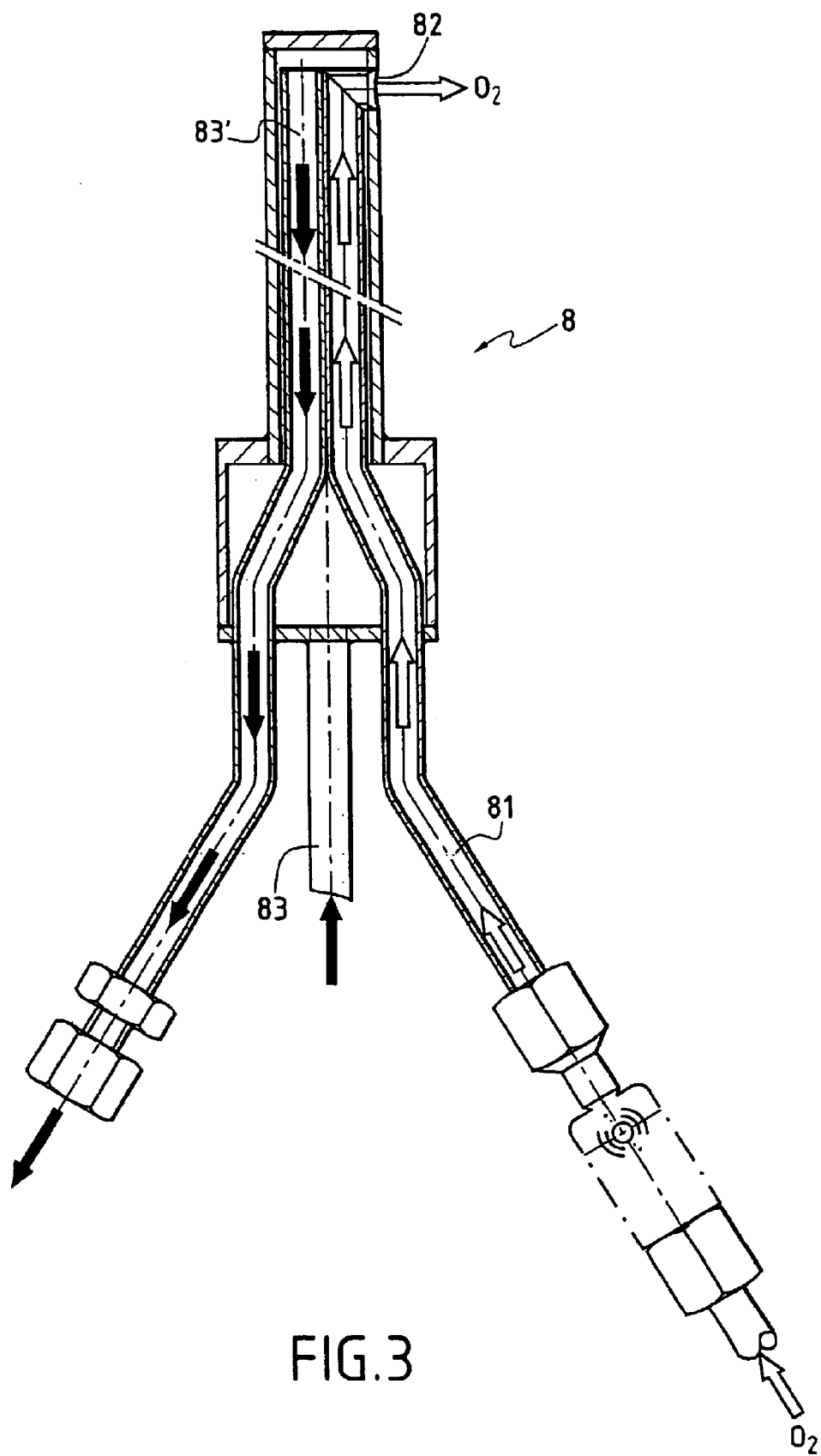
FIG. 3 is a detailed section view of means for injecting oxygen into the bath of glass.

FIG. 3 thus shows means 8 for injecting oxygen into the bath of glass. Said means 8 comprise a circuit 81 for feeding oxygen. The flow of oxygen in said circuit 81 is represented by white arrows. The oxygen is delivered at 82 via an opening that is disposed at 90° to the axis of said means 8.

In their structure, said means 8 include a circuit 83+83' for circulating a cooling fluid. Its portion which penetrates into the bath of glass can thus be cooled. Said cooling fluid arrives via 83 and leaves, having picked up heat, via 83'. Circulation of cooling fluid is represented by black arrows.

Figure 4:
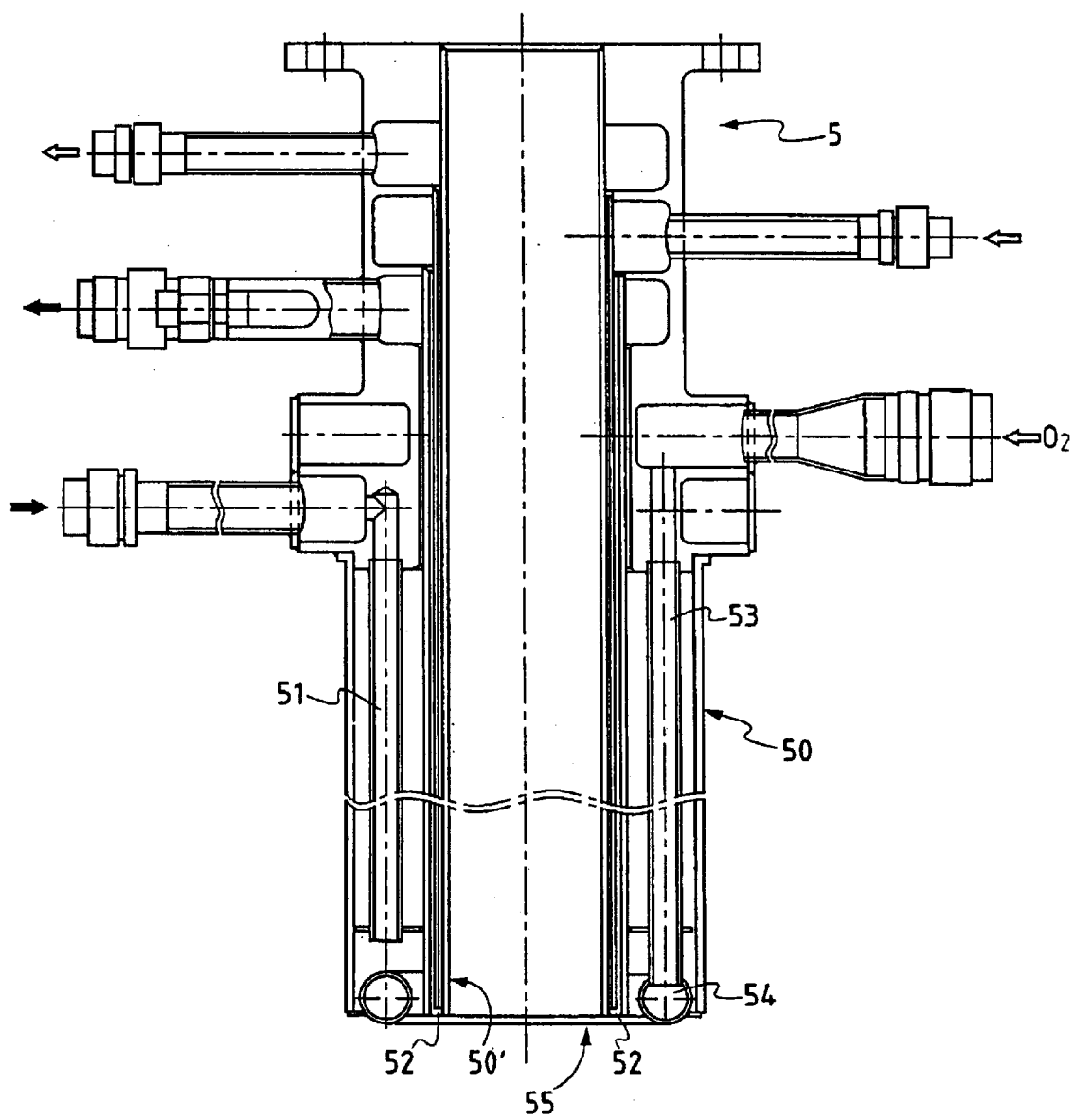
FIG. 4 is a detailed section view of the waste feeder device.

Finally, FIG. 4 shows a particularly advantageous embodiment of the device 5 for feeding the reactor 1 with waste D. Said device 5 has tubular structure defined by an outside surface 50 and an inside surface 50'.

In the thickness of said device there are to be found:
- at least one circuit 51 for circulating a cooling fluid for cooling said structure and mainly for cooling its outside face 50. The circulation of the cooling fluid is represented by black arrows;
- at least one circuit 52 for circulating a cooling fluid that is to cool said inside surface 50'. The circulation of said cooling fluid is represented by white arrows; and
- at least one circuit 53+54 for conveying and delivering oxygen to the end 55 of said device 5. Said oxygen is thus delivered all around said end 55 via a torus 54. Said torus 54 has orifices of appropriate dimensions suitably distributed to deliver said oxygen in optimized manner. This further optimizes contact between waste D and oxygen. Said oxygen as delivered via the waste feeder device 5 is delivered in addition to the oxygen delivered by the means 6 (see FIGS. 1 and 2).

Finally, it is recalled that the cooling fluid circulating in the circuit 51 is advantageously constituted by a "hot" cooling fluid.

What is claimed is:

1. A method of processing organic waste in divided solid and/or liquid form in a single reactor containing a bath of molten glass surmounted by a gas phase, comprising incinerating said waste in presence of oxygen or oxygen-containing gas acting as an oxidizer at a surface of said bath, and vitrifying said incinerated waste in said bath, the method being characterized in that:
   in addition to the oxygen or the oxygen-containing gas delivered as the oxidizer into said gas phase, oxygen or oxygen-containing gas is also injected into said bath by injection means having an open end, said injection means being cooled and arranged in such a manner that on ceasing injection, said injection means do not form a plug of glass at their open end.

2. The method according to claim 1, characterized in that said oxygen or oxygen-containing gas injected into said bath of molten glass is introduced into said reactor beneath the surface of said bath.

3. The method according to claim 1, further comprising cooling walls of said reactor and/or feeding means other than said injection means, which feed said reactor with said waste and with said oxidizer.

4. The method according to claim 3, further comprising dual cooling of the feeding means which feed said waste to s aid reactor wherein:
   a first cooling of a thickness and of an outside surface of said feeding means is designed to protect said feeding means from corrosion; and
   a second cooling of an inside surface of said feeding means is designed to minimize heat transfer to incoming waste.

5. The method according to claim 3, characterized in that said walls of said reactor in contact with said gas phase and/or said feeding means introduced into said reactor in contact with said gas phase are cooled by circulation of at least one cooling fluid maintained at a temperature higher than a dew point temperature of said gas phase.

6. The method according to claim 1, characterized in that said bath of molten glass is heated by induction, by flame, by plasma torch, or by means of electrodes dipped therein.

7. The method according to claim 1, characterized in that said method is implemented in a cold crucible heated by induction.

8. The method according to claim 1, characterized in that said waste is radioactive waste.

9. An apparatus for processing organic waste in divided solid and/or liquid form by incineration and vitrification, the apparatus comprising a reactor associated with heater means suitable for maintaining a bath of molten glass in a bottom portion of said reactor, and fitted with:
   means for emptying said bath of molten glass;
   a feeding device for feeding said waste to be incinerated and vitrified, said feeding device having an open end opening above a surface of said bath of molten glass;
   means for feeding oxygen or oxygen-containing gas, delivering said oxygen or said oxygen-containing gas above the surface of said bath of molten glass; and
   at least one combustion gas outlet provided in a top portion of said reactor well above the surface of said bath of molten glass;
   the apparatus being characterized in that said reactor is further equipped with injection means having an open end for injecting oxygen or oxygen-containing gas into said bath of molten glass; said injection means:
   are introduced into the bottom portion of said reactor beneath the surface of said bath of molten glass so that said injection means do not pass through said gas above the surface of said bath of molten glass and being arranged in such a manner that on ceasing to be fed, said injection means do not form a plug of glass at their open end; and having a structure which includes at least one circuit for circulating a cooling fluid liquid therein.

10. The method according to claim 1, wherein said oxygen or oxygen-containing gas is injected into said bath of molten glass in sufficient quantity to substantially reduce metal forming within said bath of molten glass.

11. The method according to claim 1, wherein said oxygen or oxygen-containing gas is injected into said bath of molten glass in sufficient quantity to impart moderate stirring to said bath of molten glass.

12. The apparatus according to claim 9, characterized in that said injection means are disposed vertically, pass through the bottom portion of said reactor and present an outlet at 90° to a vertical axis.

13. The apparatus according to claim 9, characterized in that said feeding device for feeding said waste and said means for feeding oxygen or oxygen-containing gas have a structure which includes at least one circuit for circulating a cooling fluid therein.

14. The apparatus according to claim 13, characterized in that the structure of said feeding device for feeding said waste is tubular and is defined by an outside surface and an inside surface, said structure including in a thickness thereof at least two circuits for circulating cooling fluids, at least one of said two circuits being adapted to cool said structure and said outside surface of said feeding device, and at least another one of said two circuits being adapted to cool said inside surface of said feeding device.

15. The apparatus according to claim 9, characterized in that said reactor has double-walled type walls, to allow a cooling fluid to circulate.

16. The apparatus according to claim 9, characterized in that said reactor is a cold crucible, and said heater means are means for induction heating.

* * * * *

UNITED STATES PATENT AND TRADEMARK OFFICE
CERTIFICATE OF CORRECTION

PATENT NO.     : 6,815,572 B1
DATED          : November 9, 2004
INVENTOR(S)    : Brunelot et al.

It is certified that error appears in the above-identified patent and that said Letters Patent is hereby corrected as shown below:

Column 9,
Line 7, please delete "fluid"

Signed and Sealed this

Eighth Day of February, 2005

JON W. DUDAS
*Director of the United States Patent and Trademark Office*